Patented Feb. 23, 1937

2,071,804

UNITED STATES PATENT OFFICE 2,071,804

ACYL OCTAHYDROFOLLICLE HORMONES AND THEIR PRODUCTION

Friedrich Hildebrandt, Hohen Neuendorf, near Berlin, Germany, assignor to Schering-Kahlbaum A. G., Berlin, Germany, a corporation of Germany No Drawing. Application May 4, 1934, Serial No. 723,898. In Germany May 5, 1933

6 Claims. (Cl. 260—103)

This invention relates to new derivatives of hydrogenation products of the follicle hormone and more particularly to acylderivatives of octahydrofollicle hormone and a method of making same.

Acyl derivatives of the dihydrofollicle hormone can be obtained, for example, by subjecting the dihydrofollicle hormone or its monoacyl derivative to the action of acylating agents, or by subjecting the acyl derivative of the follicle hormone to a treatment with nascent hydrogen or with hydrogen in the presence of a catalyst; the reduction is so conducted that no hydrogenation of the aromatic ring occurs, only two atoms of hydrogen being absorbed, the keto group of the follicle hormone being thereby converted into a secondary alcohol group.

Now I have found that the mono and diacyl derivatives of the dihydrofollicle hormone, obtained, for instance, according to the procedure above mentioned, combine with six more atoms of hydrogen upon treating the same with activated hydrogen, preferably in the presence of catalysts. Thereby the benzene nucleus present in the molecule of the dihydrofollicle hormone is hydrogenated to the cyclohexane nucleus. The compounds obtained, i. e. the mono and diacyl derivatives of the octahydrofollicle hormone represent new and useful products of very valuable therapeutical properties. They exhibit a physiological effect similar to that of the male sex hormone.

The hydrogenation of the benzene nucleus is preferably carried out in solution in a solvent by means of catalytically activated hydrogen in the presence of suitable hydrogenation catalysts. But also other methods may be used such as are known in the art, reference being had to Houben, "Methoden der organ. Chemie", third edition, vol. 2, page 325 et seq., particularly pages 328 and 329.

In order to illustrate the invention the following examples are given without, however, limiting the invention to them.

Example 1

The monobenzoyl derivative of the dihydrofollicle hormone of the M. P. 189° C. is dissolved in 20 times its weight of alcohol. To this solution 5% of a nickel-copper catalyst, obtained by reducing a mixture of nickeloxide and copperoxide (1:1) at 350–400° C., are added, whereupon it is treated at 140° C. with hydrogen. When no more hydrogen is absorbed, the reaction mixture is filtered and the solvent is evaporated, thereby leaving a colorless, glass-like residue which yields on saponification benzoic acid and octahydrofollicle hormone of the formula $C_{18}H_{30}O_2$.

The product is the monobenzoyl octahydrofollicle hormone having the following structural formula:

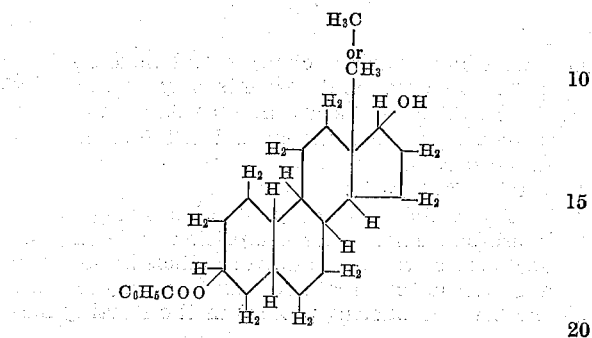

The benzoyl derivative of the isomeric dihydrofollicle hormone or a mixture of the benzoyl derivatives of the two isomeric dihydrofollicle hormones or even other acyl derivatives may be hydrogenated in an analogous manner to the corresponding octahydrofollicle hormone derivatives.

Example 2

500 mg. of the diacetyl dihydrofollicle hormone are heated in an autoclave at about 180° C. in the presence of 150 cc. of cyclohexanol and 0,5 grams of a nickel-chromium catalyst while introducing hydrogen under a pressure of 100 atmospheres. When the hydrogen absorption has ceased, the catalyst is removed by filtration and the reaction solution is evaporated to dryness in a vacuum. A light, viscous resinous residue is obtained representing a mixture of several stereoisomeric diacetyl octahydrofollicle hormones of the following general structural formula:

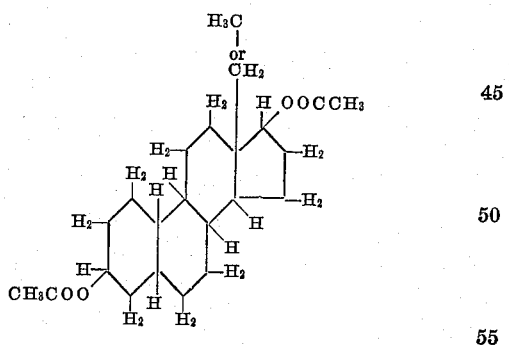

Example 3

500 mg. of the monoacetyl dihydrofollicle hormone are dissolved in glacial acetic acid whereupon the solution is shaken at room temperature in the presence of 300 mg. of a platinum oxide catalyst, obtained according to Adams-Shriner, ("Organic Synthesis" 1928, p. 92) at room temperature in a hydrogen atmosphere. When no more hydrogen is absorbed the catalyst is filtered off and the glacial acetic acid is distilled off in a vacuum. The remaining residue is a light, viscous resin consisting of a mixture of several stereoisomeric octahydrofollicle hormone monoacetyl compounds of the general structural formula:

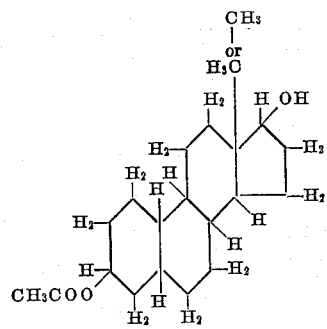

Of course, various changes and modifications in the processes and reagents may be made by those skilled in the art in accordance with the principles set forth herein and in the claims annexed hereto.

What I claim is:

1. A method for the production of acyl octahydrofollicle hormones, comprising subjecting the acyl derivatives of the dihydrofollicle hormone to a hydrogenating treatment sufficient only to cause the benzene nucleus present in the starting material to be transformed into the cyclohexane nucleus.

2. A method for the production of acyl octahydrofollicle hormones, comprising subjecting solutions of the acyl derivatives of the dihydrofollicle hormone to a hydrogenating treatment sufficient only to cause the benzene nucleus present in the starting material to be transformed into the cyclohexane nucleus.

3. A method for the production of acyl octahydrofollicle hormones, comprising treating the acyl derivatives of the dihydrofollicle hormone with activated hydrogen in the presence of hydrogenation catalysts until six hydrogen atoms are taken up by one molecule of the starting material.

4. A method for the production of acyl octahydrofollicle hormones, comprising treating solutions of the acyl derivatives of the dihydrofollicle hormone with activated hydrogen in the presence of hydrogenation catalysts until six hydrogen atoms are taken up by one molecule of the starting material.

5. A method for the production of acyl octahydrofollicle hormones, comprising treating solutions of the acyl derivatives of the dihydrofollicle hormone with activated hydrogen in the presence of hydrogenation catalysts under superatmospheric pressure until six hydrogen atoms are taken up by one molecule of the starting material.

6. The method of producing saturated, acyl-substituted cyclopentano phenanthrene compounds which comprises subjecting the acyl derivative of a partially hydrogenated follicle hormone having an unsaturated aromatic first ring to a hydrogenation treatment sufficient only to cause saturation of such ring.

FRIEDRICH HILDEBRANDT.